United States Patent
Weihs

Patent Number: 6,052,157
Date of Patent: Apr. 18, 2000

[54] SYSTEM AND METHOD FOR SEPARATING CHROMINANCE AND LUMINANCE COMPONENTS OF A COLOR TELEVISION SYSTEM

[75] Inventor: Paul J. Weihs, Sunnyvale, Calif.

[73] Assignee: Innovision Labs, Cupertino, Calif.

[21] Appl. No.: 08/905,187

[22] Filed: Aug. 4, 1997

[51] Int. Cl.$^7$ ...................................................... H04N 9/50
[52] U.S. Cl. .......................... 348/663; 348/665; 348/638; 348/659; 348/667; 358/11; 358/31
[58] Field of Search .................... 348/660, 661, 348/663, 665, 666, 667, 668, 659, 450, 638, 639, 640, 641, 642, 607, 609; H04N 9/50

[56] References Cited

U.S. PATENT DOCUMENTS

| | | | |
|---|---|---|---|
| 3,946,431 | 3/1976 | Gantert | 358/4 |
| 4,179,705 | 12/1979 | Faroudja | 358/31 |
| 4,240,105 | 12/1980 | Faroudja | 358/31 |
| 4,283,739 | 8/1981 | Martinez | 358/24 |
| 4,385,311 | 5/1983 | Harwood | 358/28 |
| 4,533,938 | 8/1985 | Hurst | 358/27 |
| 4,558,347 | 12/1985 | Pritchard | 348/450 |
| 4,583,113 | 4/1986 | Pritchard | 358/11 |
| 4,731,660 | 3/1988 | Faroudja et al. | 358/31 |
| 4,745,463 | 5/1988 | Lu | 358/23 |
| 4,864,389 | 9/1989 | Faroudja et al. | 358/31 |
| 4,893,176 | 1/1990 | Faroudja | 358/31 |
| 5,132,784 | 7/1992 | Hague | 348/665 |
| 5,483,294 | 1/1996 | Kays | 348/609 |
| 5,512,960 | 4/1996 | Hatano | 348/640 |

*Primary Examiner*—John K. Peng
*Assistant Examiner*—Wesner SaJous
*Attorney, Agent, or Firm*—Sawyer Law Group LLP

[57] ABSTRACT

A method and system for separating chrominance and luminance information from a composite spectral signal is disclosed. The method and system comprises demodulating the composite signal prior to separation of the chrominance or luminance information to provide a first U subcomponent and a first V subcomponent and then processing and filtering the first U subcomponent and the first V subcomponent to provide a second U subcomponent and a second V subcomponent, respectively. The method and system also includes combining the second U subcomponent and the second V subcomponent to provide the remodulated chrominance information. In so doing chrominance information is provided in which artifacts are substantially attenuated. Accordingly, by "bypassing" the encoded space to provide "clean U and V" signals directly from the composite signal, the chrominance information or component has no inherent phase (hue) sensitivity to its simultaneously demodulated U and V subcomponents as it does when utilizing conventional comb filtering techniques. Therefore, artifacts in the subcomponents is attenuated. Hence, the artifacts within the remodulated chrominance and extracted luminance information are also substantially attenuated.

92 Claims, 15 Drawing Sheets

= H Stopboard

= V Stopboard

SYSTEM AND METHOD FOR SEPARATING CHROMINANCE AND LUMINANCE COMPONENTS OF A COLOR TELEVISION SYSTEM

FIELD OF THE INVENTION

The present invention relates to signal processing equipment and methods for processing quadrature modulated color subcarrier television signals. More particularly, the present invention relates to improved control methods and circuitry enabling operation of filtering apparatus with minimal introduction of any artifacts into the resultant signal on account of chrominance transitions in the vertical and temporal (time) domains as well as being simpler and more efficient than known techniques.

BACKGROUND OF THE INVENTION

Passive comb filtering techniques are known for separating chrominance and luminance components of a quadrature modulated color television picture signal. Such comb filters are typically implemented with single or multiple scan line and picture frame period delays. Since the phase of chrominance is in opposition from line to line and from frame to frame (in the NTSC signal format), the process of adding a present scanning line to a line which has been delayed by one scanning line period, or adding a frame to a frame which has been delayed by one picture frame period, results in phase cancellation elimination of the chrominance component, and resultant extraction of the luminance component from the composite video color signal. By a subtractive process the chrominance component likewise may be extracted from the composite video.

In quadrature modulated color subcarrier television signal formats, comb filtering is achieved by the process of adding information coming from a certain number of successive scanning lines. This manipulation is limited to spectral areas containing both the luminance and chrominance components (e.g. 2.3 to 4.2 Mhz in the NTSC format) by means of bandpass filters. The full bandwidth luminance information is typically obtained by addition of the inverted combed bandpass filtered component and a delay matched source component. The addition of signals coming from successive lines is carried out by taking the signal from the first line, for example, and multiplying the signal by a certain coefficient, and adding the signal from a second line as multiplied by a second certain coefficient, and adding the signal from a third line as multiplied by a third certain coefficient. In a typical situation, where the signal from line 1 is V1, the signal from line 2 is V2, and the signal from line 3 is V3, a standard comb filter arrangement is:

$$Y = \frac{1}{4}V1 + \frac{1}{2}V2 + \frac{1}{4}V3 \quad \text{(equation 1)}$$

(luminance in the vicinity of the subcarrier spectral area) and $$C = \frac{1}{4}(2V2 - V1 - V3) \quad \text{(chrominance)} \quad \text{(equation 2)}$$

In this example, the fractional values ¼ and ½ are the coefficients of the comb. Similar computations apply to temporal comb filters, where V1, V2 and V3 represent signals which are either undelayed (V1) or delayed by one picture frame period (V2) or by two picture frame periods (V3).

When compared to band pass filters and traps, passive comb filters work very well for separating chrominance and luminance, due to their wide bandwidth. However, the performance of passive comb filters breaks down when changes occur between lines or frames. When such changes appear, phase cancellation (averaging) from line to line or from frame to frame of the unwanted component does not perfectly occur. Instead, artifacts such as chroma blurring and horizontal dots in the luminance at the chroma subcarrier frequently are generated by the comb filtering process and may be objectionably visible to the viewer, particularly as the bandwidth of television displays has increased to include frequencies lying well above the subcarrier frequency (3.58 Mhz in the NTSC system).

A number of proposals have been presented in the prior art for changing the comb filter structure or operation during transition conditions in an attempt to avoid the unwanted picture artifacts otherwise produced. In essence, the prior approaches have been either to alter the structure of the comb filter by on-off switching operations and/or to substitute a trap or other bandwidth limiting filter in place of the comb filter for the interval in which comb filter separation of chrominance/luminance breaks down. These prior attempts to make otherwise passive comb filters adaptive at vertical chroma transitions have not achieved a satisfactory solution to eliminate unwanted picture artifacts while maintaining high bandwidth characteristics of the comb filter.

One prior proposal is set forth in the Rossi U.S. Pat. No. 4,050,084. This patent describes a digitally implemented two scanning line delay comb filter for putting out a combed chroma component and a combed luminance component when there is no change of chrominance in the vertical direction (from line to line).

When the Rossi system detects a vertical amplitude transition in the chroma between two adjacent scan lines, Rossi's chroma comb filter system thereupon switches to a 0 V1+½ V2−½ V3 configuration for the vertical chroma transition interval at the first line thereof, and then switches to a ½ V1+½ V2+0 V3 configuration for the vertical chroma transition interval at the second line thereof. This reconfiguration Rossi comb filter is carried out in real time by manipulation between zero and one half amplitude coefficient values for the V1 and V3 terms of the comb during the transition. Thus, Rossi's progressive adaptation of the comb filter structure by coefficient manipulation enables it to avoid the chroma transition and the artifacts otherwise produced. In other words, the Rossi comb filter is adaptive in the sense that in the absence of a vertical chroma transition the output is combed on the basis of three scanning lines. When a vertical transition occurs, combing reverts to a two scanning line basis, with information being combed coming during the first line of the transition from the second and third lines, and with information being combed coming during the second line of the transition from the first and second lines.

One of the drawbacks of the Rossi system is that if there are multiple chroma transitions within three adjacent scan lines, the Rossi comb filter logic collapses, and that system switches to a notch filter for the duration of the trouble. That is to say, if V1 is different from V2 and V2 is different from V3, then the Rossi system switches from comb filter processing to a low pass filter in the luminance path and to a band pass filter (notch) in the chrominance path.

Another significant drawback of the Rossi system is that it is controlled only upon detection of changes in chroma amplitude. The control signal relied upon by the Rossi system employs the difference of the rectified chroma from line to line. If, for example, a color phase shift (change in hue) occurs between two lines and it is not accompanied by a commensurate amplitude shift, the Rossi system is not capable of switching off the comb filter, and horizontal dots appear in the luminance in one or more scan lines of the picture.

A further drawback of the Rossi system is that it makes use of hard switching between the three operational configurations. There is no proportional or gentle switching between the three modes, and the switching transitions are abrupt.

Another comb filter system in the prior art was developed by Barco Electronic n.v., Noordlaan 5 Industriezone, B-8720 Kuurne, Belgium and was included in color television decoding apparatus introduced into the United States in about 1981. The Barco system was similar to that described in the Rossi patent, in that combing was switched from three lines to two lines in a manner that attempted to skirt the chrominance vertical transition. The Barco apparatus required an additional scan period delay line in order to provide a one line period look ahead or advance warning that a vertical chroma transition was imminent. Once a transition was detected on a look ahead basis, the Barco apparatus changed the coefficients of the comb on a step function (yes or no basis) by switching from the three line-based configuration to two two-line based comb filter configurations during the line blanking interval for the lines having the detected chroma vertical transition.

One apparent drawback of the Barco approach was that an entire scan line of video information was necessarily modified as a result of switching during the horizontal blanking interval, even though only a very small portion of the scan line was subject to degradation by the presence of a vertical chroma transition. As a result, in some situations high frequency luminance components became offset spatially by one line with diagonal transitions taking on a visible raggedness or step effect.

The Barco system had the same drawback as the Rossi system in that it made use only of information in the chroma bandwidth in the vicinity of the color subcarrier in order to control the switching action.

U.S. Pat. No. 4,179,705 describes a method for switching comb filter apparatus. Essentially, the '705 patent describes a method to switch off the comb filter and replace it with a low pass filter in the luminance path and a band pass filter in the chrominance path in the presence of a vertical transition. The vertical transition was detected by looking at the differences in chroma energy on a line to line basis. While this system worked reasonably well, it had a time constant (slight delay) during which to make a control decision and suffered from the frequent situation that the chroma picture information is a very weak source of information upon which to make a decision concerning chroma processing. The slight delay in the control led to poorly defined (fuzzy or soft) chroma transitions during switching. Reducing the delay led to excessive control circuit implementation costs. Thus, the system either cost too much, or it let two or three horizontal dots get through to the display screen before the trap was switched in. Consequently, while this system worked well under test signal conditions, it proved inefficient in processing real picture signal content.

U.S. Pat. No. 4,240,105 performs the same switching operation as was described in his '705 patent, but in response to different, additional control information. The system described in the '105 patent makes use not only of the chroma difference in the vertical domain but also the low frequency luminance difference which is statistically highly correlated to simultaneous chroma transitions and which provides a much stronger, more robust signal upon which to develop a switching control signal. However, while the switching based on the luminance transition was faster than the prior approach, the process of switching to a notch filter or trap in lieu of the comb filter structure during detected chroma transitions led to visibly soft transition edges: i.e., the reduced bandwidth resulting from the trap caused the picture to lack sharpness at the chroma transition.

An adaptive technique which is an improvement over the above-identified system is described in the Faroudja U.S. Pat. No. 4,864,389 which describes a comb filter apparatus which extracts at least one of the chroma and luminance from a quadrature modified subcarrier television input. The described method implemented by the described apparatus includes the steps of delaying the input signal through a plurality of predetermined delay periods wherein the duration of each delay period is related to line scan period or picture frame period, filtering the undelayed and delayed signals so that energy components of the input signal lying in the vicinity of the chroma subcarrier frequency are passed, thereby providing bandpass filtered undelayed and delayed signals, detecting amplitude and sense of periodic transitions lying in the chroma energy passband, multiplying two of the undelayed and delayed signals by the continuously variable coefficients to produce an error correction signal. However, as will be discussed in detail later, this system requires precise components in its demodulation circuits to provide clean chrominance and luminance information.

To discuss the problems with prior art filtering arrangements in a more general context, refer to the following. FIG. 1 is a representation of the conventional process for the separation of a composite signal into its components. The composite signal is typically separated first into the luminance component (Y) and a chrominance component (C) through YC separation. Hereinafter, the separation during this process will be referred to as separation in encoded space.

Thereafter, the chrominance component C is demodulated to provide a first subcomponent (U) of the chrominance component C and a second subcomponent (V) of the chrominance component C. Typically, the subcomponent U is in the blue oriented axis of the chrominance and V is in the red oriented axis of the chrominance. In such an environment the U and V subcomponents are orthogonal to each other.

Typically, conventional comb filters address the issue of transforming the separated chrominance component C into the U and V components. However, because conventional comb filters operate within the encoded space that is, before the chrominance has been demodulated, these types of systems do not provide "clean" Y and C components. That is, these conventional comb filtering techniques do not provide a luminance component without the artifacts of the chrominance or vice versa, unless the signal in two adjacent lines are either perfectly in phase or perfectly out of phase.

Since the separation of the chrominance is performed in the encoded space, the cancellation effect of the chrominance information has an inherent phase (hue) sensitivity relative to its simultaneously demodulated U and V subcomponents. One way to address this relative phase sensitivity problem is to utilize very precise binning of the phase adaptive decision logic as above described in U.S. Pat. No. 4,864,389, in the demodulation circuits that provide the U and V subcomponents to ensure that the resulting U and V subcomponents are clean. In addition, this type of system, although being an improvement over other known systems, depends on the high frequency sidebands having a precise and constant relationship with the long term phase across the line. Consequently, the solution described in the above-identified patent can prohibitively increase the cost and complexity of the comb filter such that the system would be too expensive for general applications.

Consequently, in conventional composite spectral signal environments, such as in color television environments, artifacts in the chrominance subcomponents remain when utilizing conventional comb filtering techniques. In addition, the techniques typically utilized to minimize the artifacts are complex as well as being too expensive to effectively implement.

In addition, it is desirable to scale the video image. Scaling is the ability to enlarge or shrink the video image. It is important for zoom, pan, format conversion, aspect ratio changes, optical correction, coordinate conversion, visual effects and picture-in-picture display. Although video scaling can be performed in the composite domain, it places significant restrictions on the sample selection due to the modulation of the signal. Consequently, virtually all scaling is done in the component domain.

Accordingly, what is desired is a system and method in which chrominance and luminance can be separated in an efficient manner for subcarrier spectral environments, particularly color television systems. A system and method is also desired in which the subcomponents of the chrominance can be separated in such a manner that the effects of the artifacts of one on the other can be attenuated. The method and apparatus should be easily implemented and adaptable to existing color television sets. In addition, the method and apparatus should be cost effective and easily manufactured using existing technologies. The present invention addresses such a need.

SUMMARY OF THE INVENTION

A method and system for separating chrominance and luminance information from a composite spectral signal is disclosed. The method and system comprises demodulating the composite signal prior to separation of the chrominance or luminance information to provide a first U subcomponent and a first V subcomponent and then processing the first U subcomponent and the first V subcomponent to provide a second U subcomponent and a second V subcomponent, respectively.

The method and system also includes combining the second U subcomponent and the second V subcomponent to provide the remodulated chrominance information. In so doing chrominance information is provided in which artifacts are substantially attenuated. Accordingly, by "bypassing" the encoded space to provide "clean U and V" signals directly from the composite signal, the chrominance information or component has no inherent simultaneous sensitivity to its U and V subcomponents as it does when utilizing conventional comb filtering techniques. Therefore, artifacts in the subcomponents are attenuated. Hence, the artifacts in the remodulated chrominance and luminance information are also substantially attenuated.

DESCRIPTION OF THE INVENTION

The present invention relates to separation of the chrominance and luminance components of a color television system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Heretofore, the conventional way to analyze the separation of chrominance and luminance of a composite spectral signal has been one dimensionally. As has been above-mentioned, conventional comb filtering techniques try to remove artifacts of the chrominance and luminance components in the encoded space based upon the luminance being in one frequency bandwidth and the chrominance being within another frequency bandwidth. To more clearly illustrate this analysis refer now to FIG. 2 which is a block diagram of a first conventional system 10. As is seen, the composite signal is separated in the encoded space based upon their respective frequency bandwidths, via low pass filter 12 for the luminance (Y) and a bandpass filter 14 for the chrominance (C). FIGS. 2A, 2B and 2C represent the spectral separation by the system of FIG. 2. Thereafter, the U and V subcomponents are provided from the chrominance (C) via demodulators 16 and 18, respectively.

Figure 3:
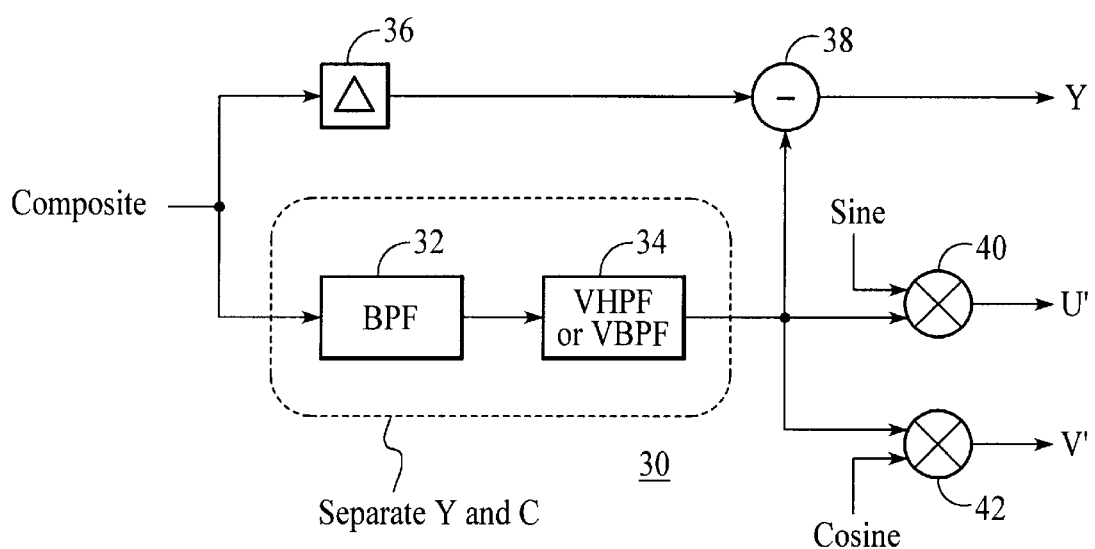
FIG. 3 is a block diagram of a second conventional comb filtering system.

A second conventional system for the separation of the chrominance and luminance is shown by the block diagram 30 of FIG. 3. In this embodiment, the composite signal is provided to a bandpass filter 32. Thereafter, the bandpassed filtered composite signal is then provided to either a vertical highpass filter (VHPF) 34 in the case of NTSC or a vertical bandpass filter (VBPF) 34 in the case of PAL to separate the luminance and chrominance components. Note that the separation once again is occurring in the encoded space. The chrominance component is then demodulated to provide U and V subcomponents via demodulators 40 and 42, respectively. The chrominance is subtracted by the delayed composite signal to provide the luminance component (Y), via subtractor block 40.

Figure 1:
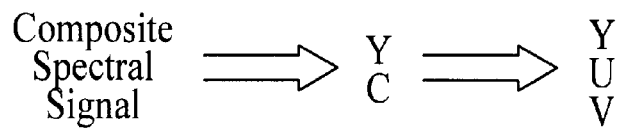
FIG. 1 is a representation of the conventional process for the separation of a composite signal into its components.
Figure 2:
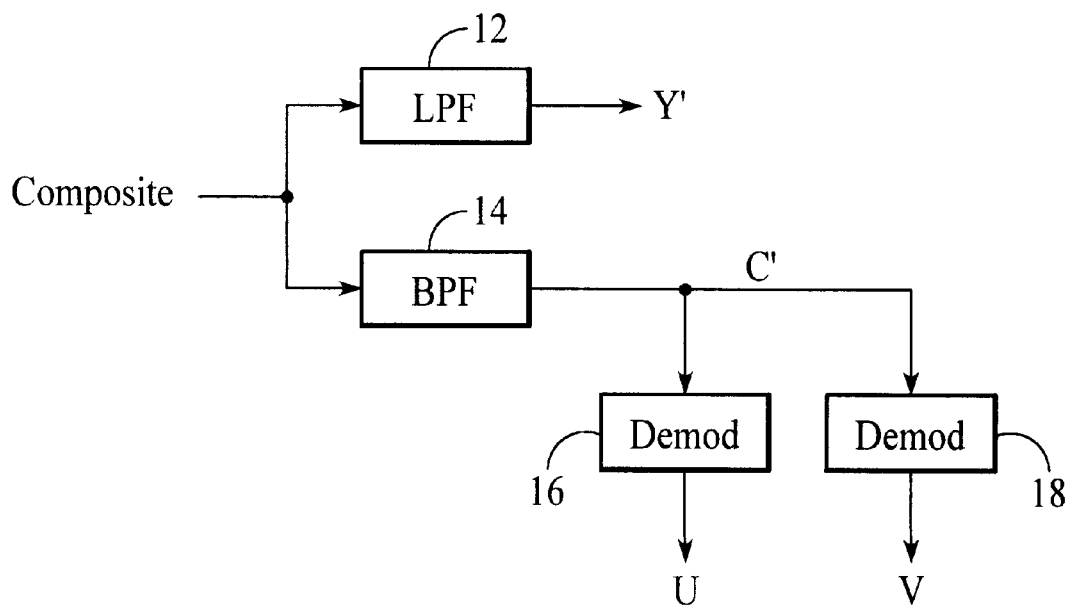
FIG. 2 is a block diagram of a first conventional filtering system.
Figure 2A:
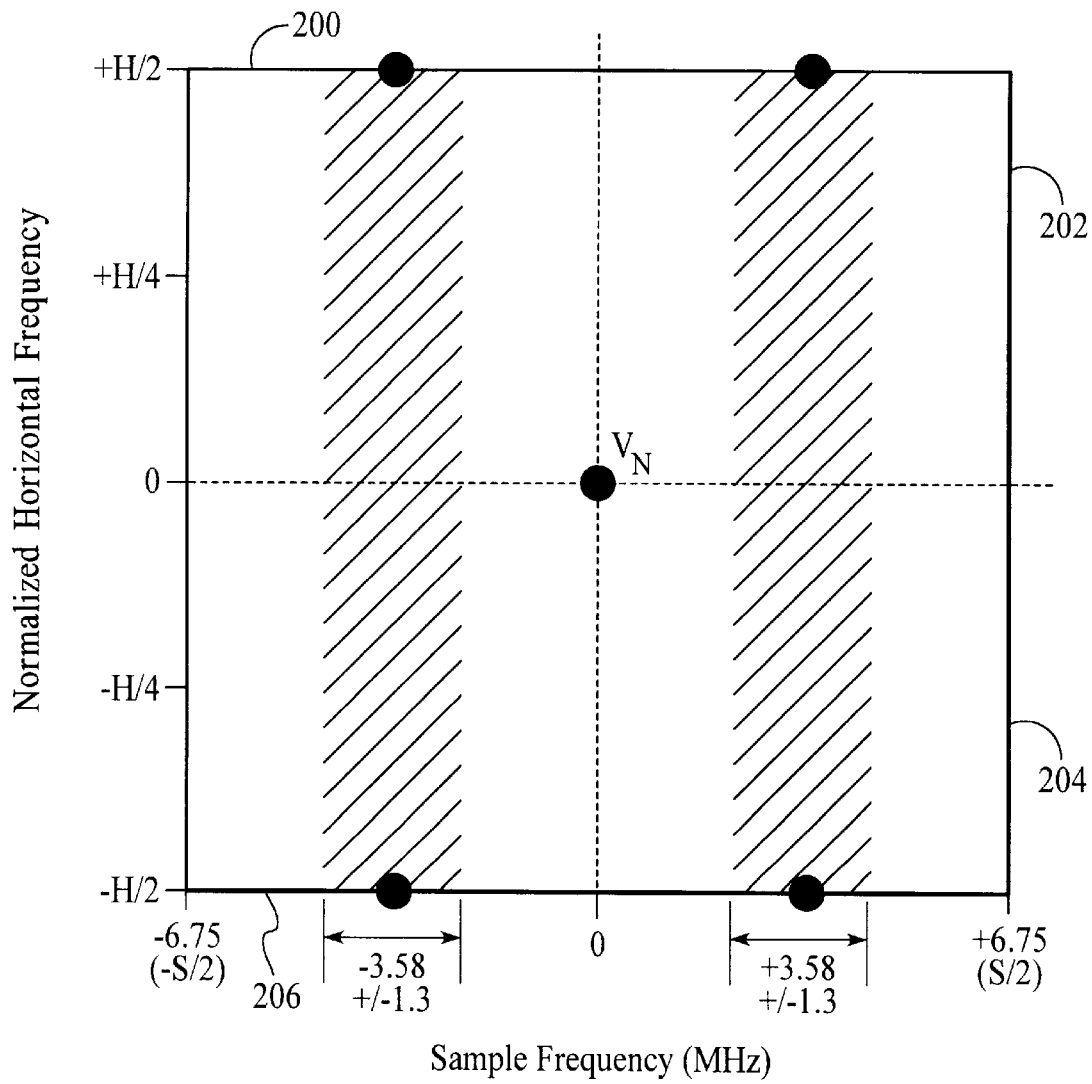
FIGS. 2A, 2B and 2C represent the spectral separation by the system of FIG. 2.
Figure 2B:
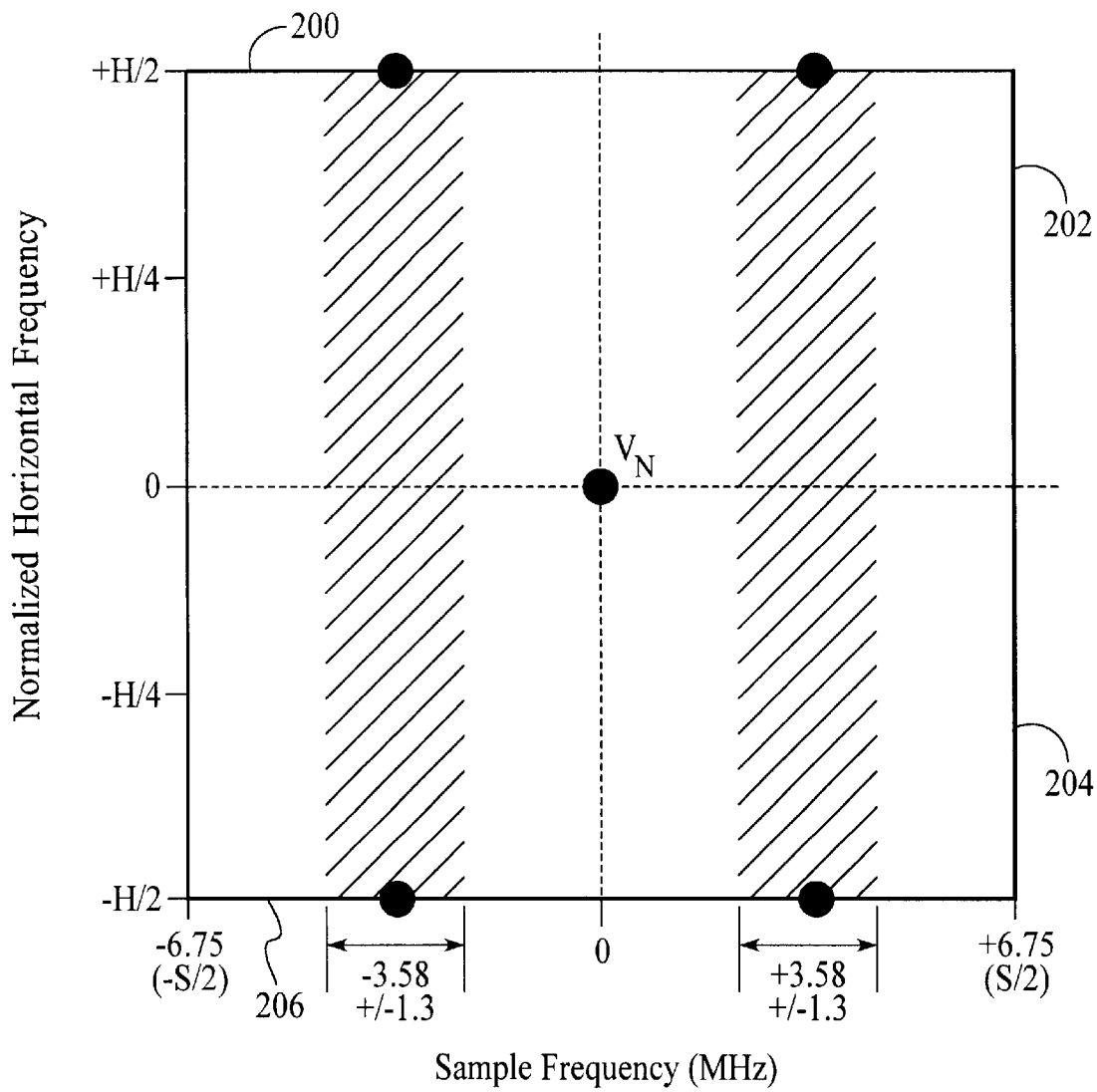
Figure 2C:
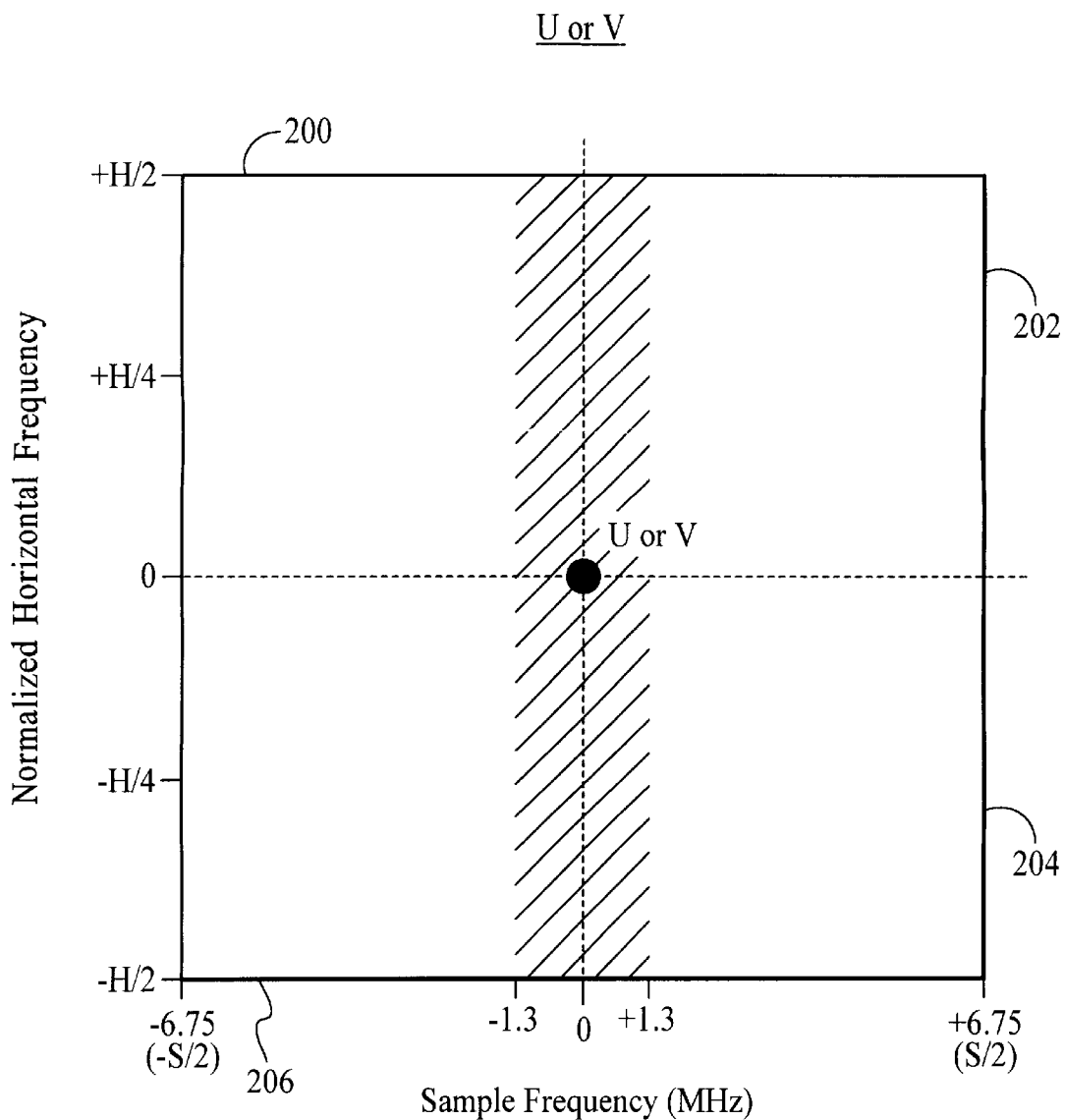

As above-described, since the separation of the chrominance subcomponents is performed in the encoded space, as illustrated in FIGS. 2 and 3, the resultant chrominance component from the demodulated U and V subcomponent has an inherent phase (hue) sensitivity to the simultaneously demodulated U and V subcomponent. As a result, a very small change in the phase between the two subcomponents (U and V) can result in a significant loss in signal quality.

Accordingly in a system and method in accordance with the present invention, the encoded space is "bypassed" to provide "clean" U and V subcomponents (that is U and V subcomponents where the artifacts are attenuated) directly from the composite signal. In so doing artifacts created in one of the subcomponents as a result of the other subcomponent are attenuated. Accordingly, the chrominance no longer has an inherent phase (hue) sensitivity to the simultaneously demodulated U and V subcomponents as is the case for conventional comb filtering techniques.

To more fully describe the present invention, refer now to the following discussion in conjunction with the accompanying figures.

Figure 4A:
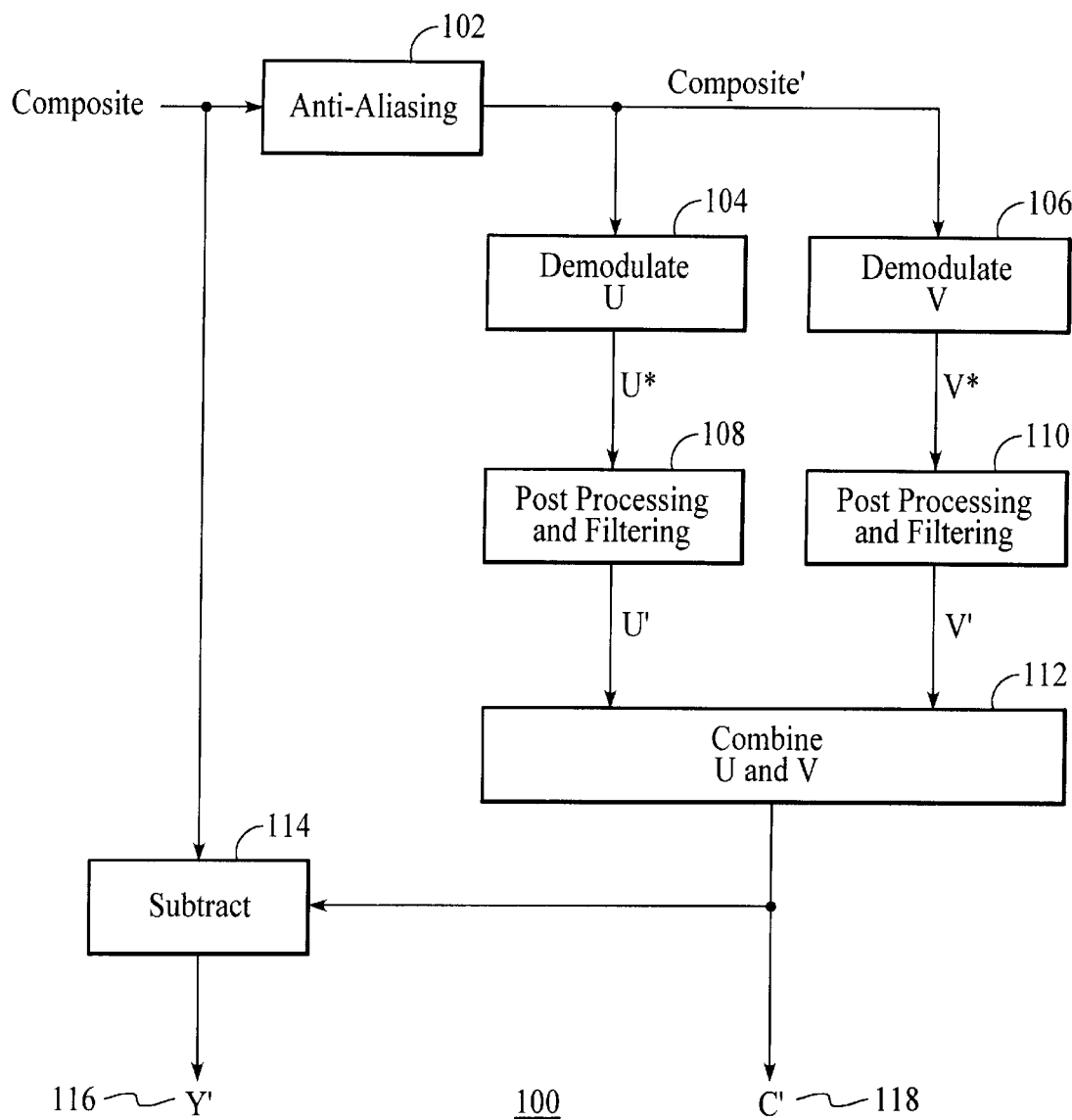
FIG. 4A is a simple block diagram of a first embodiment of a system in accordance with the present invention.

FIG. 4A is a simple block diagram of a first embodiment of a system in accordance with the present invention. As is seen, the composite signal is modified by an anti aliasing block 102 to prevent aliasing of the subcomponent signals to provide a composite' signal. Demodulators 104 and 106 are then utilized to provide a first U subcomponent U* and a first V subcomponent V* from the composite' signal, respectively. The U* and V* subcomponents are dirty in that there are artifacts therewithin. However, as will be discussed in detail, later the removal of the artifacts of one subcomponent is independent of the other. The U* and V* subcomponents are then horizontally and vertically processed, via processing blocks 108 and 110, respectively, to provide second U' and V' subcomponents. The second U' and V' subcomponents are clean, that is, the artifacts are substantially removed. It should be understood there is no particular sequencing of the vertical and horizontal processing. For example, the signals could be sequentially horizontally and vertically processed or sequentially vertically and horizontally processed or the vertical and horizontal processing can occur substantially simultaneously, and each would be within the spirit and scope of the present invention. Thereafter, the clean U' and V' subcomponents are remodulated and combined, via the combiner block 112 to provide the remodulated chrominance component C'. Thereafter C' is subtracted, via subtractor 114 to provide the clean luminance component Y'.

Figure 4B:
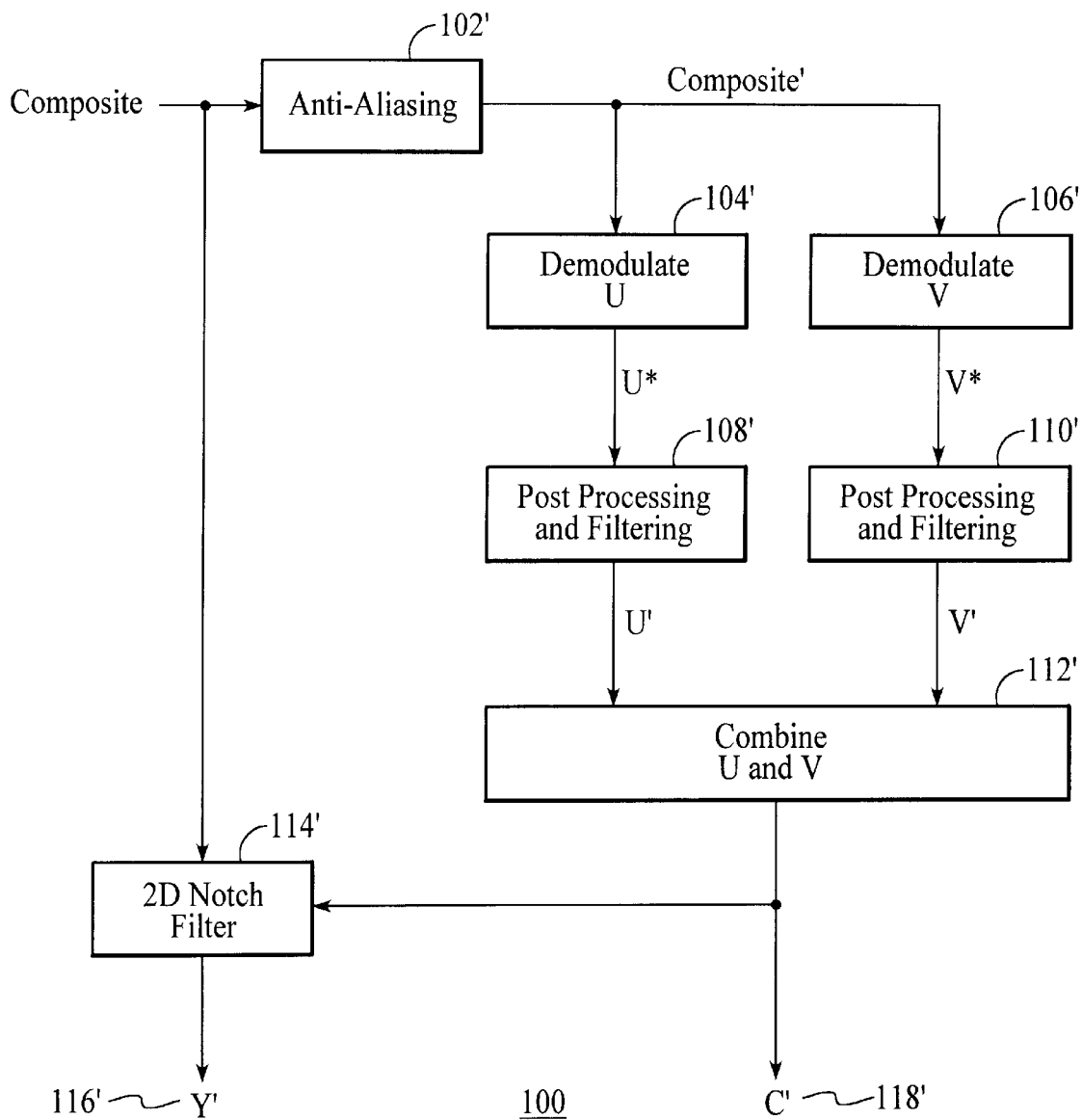
FIG. 4B is a simple block diagram of a second embodiment of a system in accordance with the present invention.

In a second embodiment, shown in FIG. 4B, the components are substantially the same, however, rather than subtracting the remodulated chrominance to provide the extracted luminance (Y') as shown in FIG. 4A, a two-dimensional notch filter 114' can be utilized to clean up the composite and thereby convert the signal into luminance (Y') directly.

Accordingly, by demodulating the chrominance subcomponents from the composite signal rather than within the encoded space, cleaner chrominance and luminance signals can be provided. As before mentioned, rather than looking at the filtering problem as a one dimensional issue of frequency bands, the filtering should be viewed as a two dimensional problem of vertical frequency and horizontal frequency within a predetermined period of time.

The visualization utilizes 2D contour or 3D plots where the signal is $T_{ime} \rightarrow F_{requency}$ (Fourier) transformed in multiple passes each with a different normalization period, in this case the sample and line-frequencies. The resulting set of values are combined to create the graphs.

Therefore, the luminance information can be viewed as being at a DC or zero point in such a two dimensional diagram, while the chrominance information is located centered at several points on the x–y axes whose coordinates represent the fractional ratio of the signal frequency components versus normalization frequency. This information can then be utilized to provide the first U and V subcomponents.

FIGS. 5A–5G illustrate a series of spectral diagrams of the chrominance and luminance components when being processed by a system in accordance with the present invention. In FIGS. 5A–5G, the x axis comprises the horizontal frequencies of the spectral signals and the y axis comprises the vertical frequencies of the spectral signals. In these figures Y is the luminance and N is the NTSC chrominance and P is the PAL chrominance. In this embodiment, the horizontal frequency axis is S wide and the vertical frequency is H long. In this embodiment, S is 13.5 Mhz. Also in FIGS. 5A–5G the diagrams are divided into four sections 200, 202, 204 and 206.

The composite signal is represented such that the luminance signal (Y) is located at the 0,0 or a DC point on the x,y coordinate system. As is seen in FIG. 5A, a first N is located in section 200 at H/2, and between –S/2 and 0, a second N is located in section 202 at H/2 and between –S/2 and 0, a third N is located in section 204 at –H/2, and between 0 and +S/2 and a fourth N is located in section 206 at –H/2 and between 0 and –S/2.

Figure 5A:
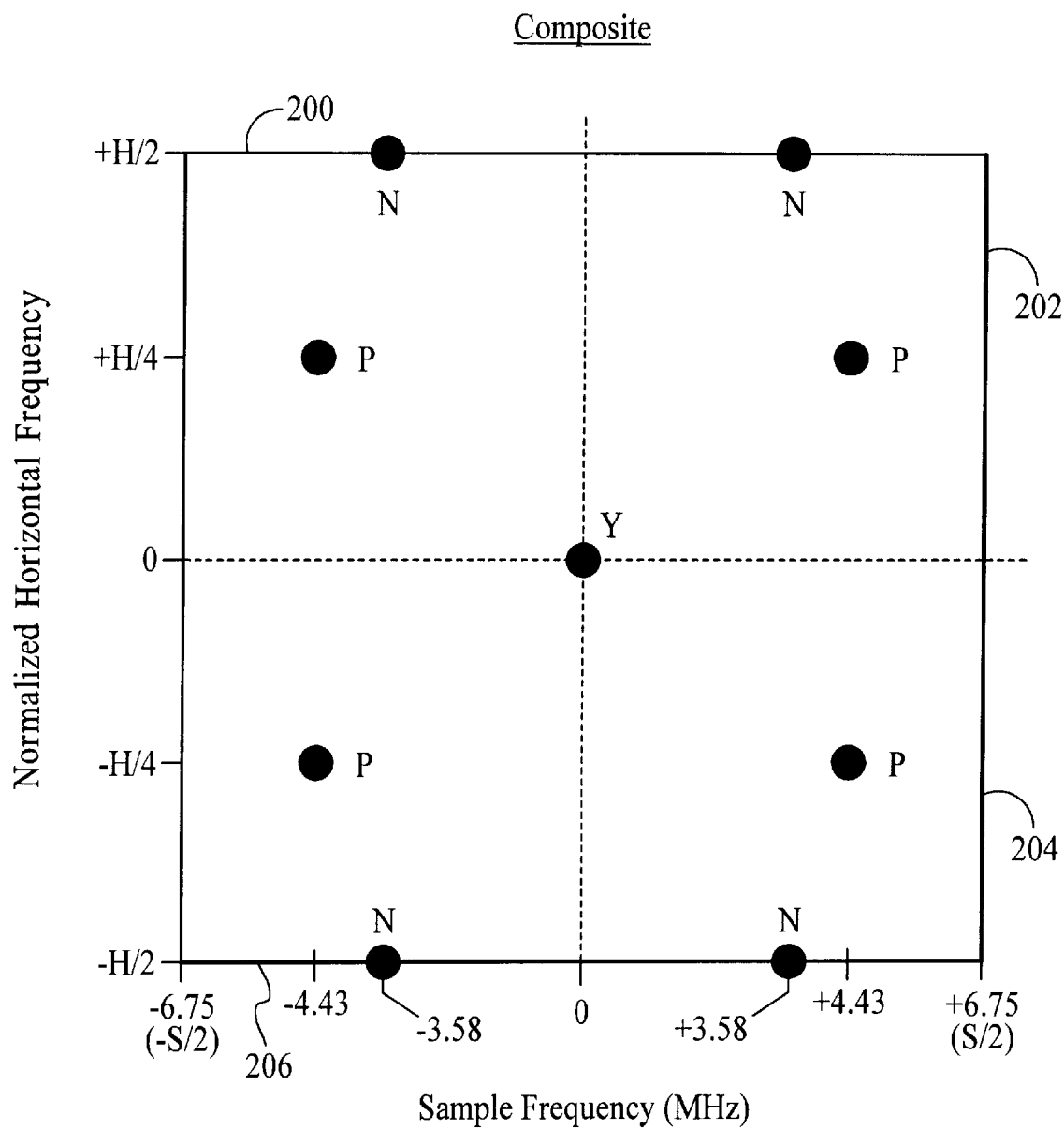
FIGS. 5A–5G illustrate a series of spectral diagrams of the chrominance and luminance components in the system of FIGS. 4A and 4B.

P as shown in FIG. 5A has a similar relationship to the luminance (Y) as N but as is seen the four Ps are also on the x,y coordinate system. As seen in FIG. 5A, a first P is located in section 200 at +H/4, and between N in quadrant 200 and –S/2, a second P is located in section 202 at –H/4 and between N in section 202 and S/2, a third P is located in section 204 at –H/4, and between N in section 204 and +S/2 and a fourth P is located in section 206 at –H/4 and between N in sections 206 and –S/2.

Figure 5B:
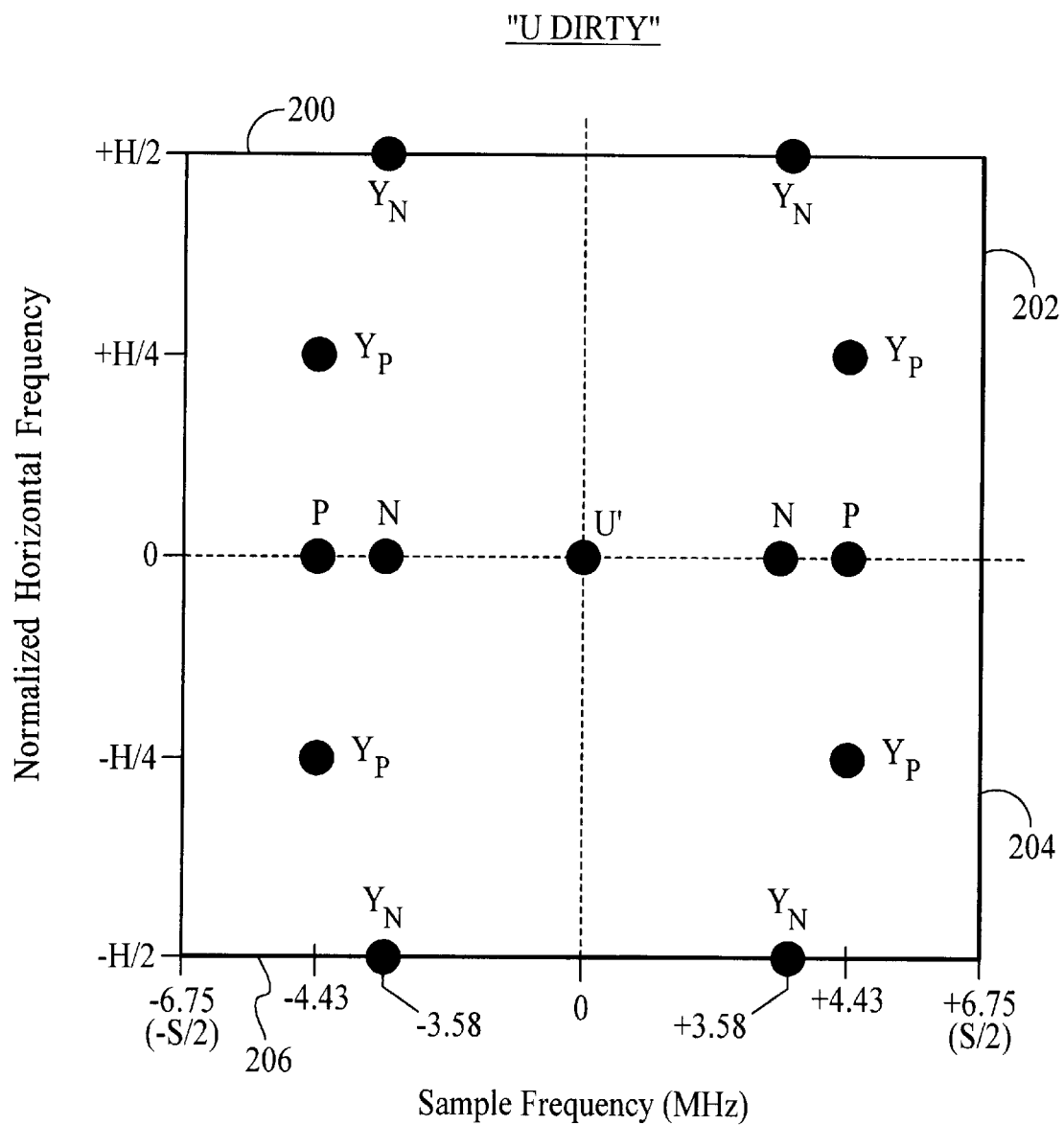
Figure 5C:
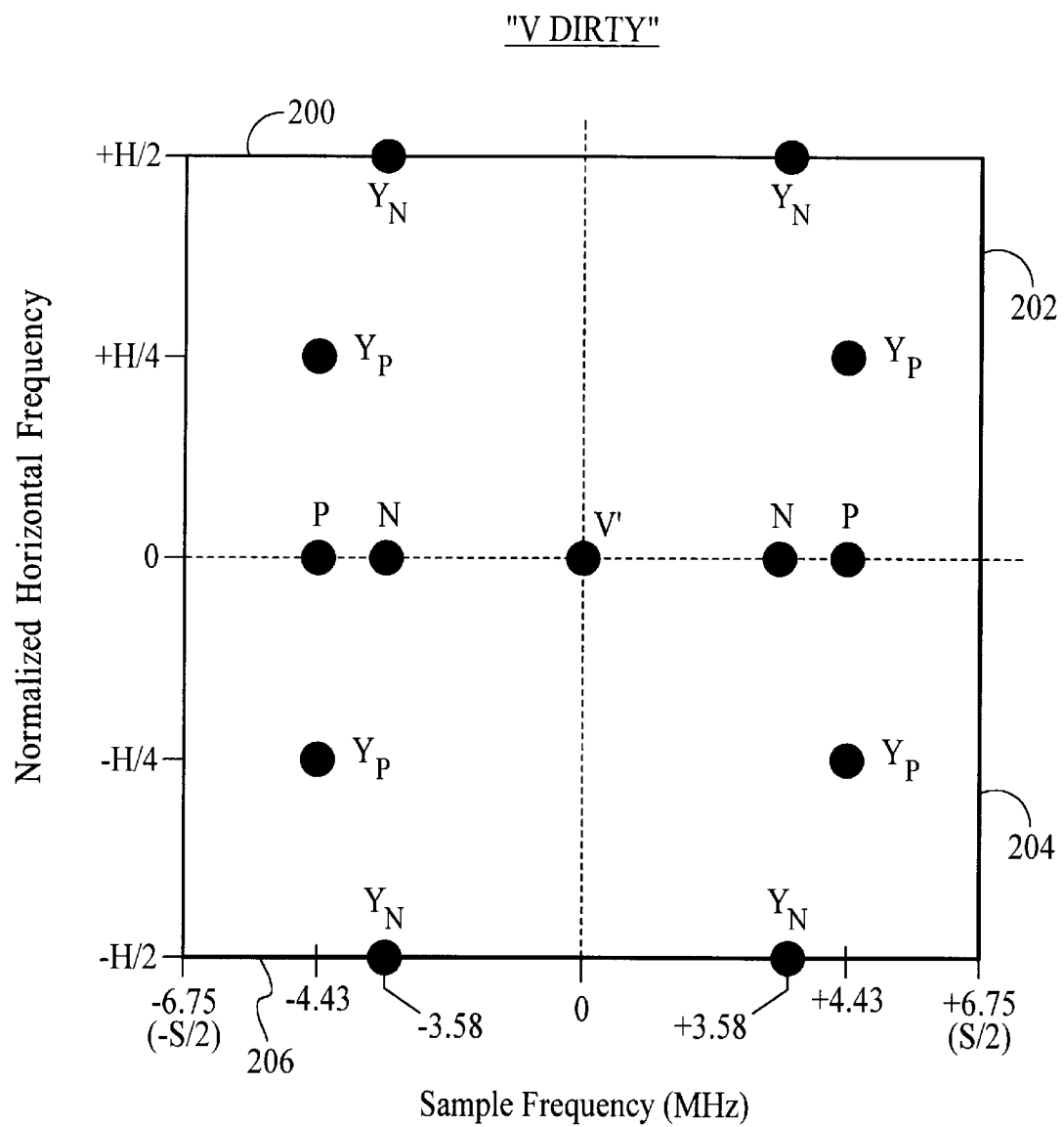

Next, the modulated composite signal is demodulated to provide the dirty U' and V' subcomponents in FIGS. 5B and 5C. As is seen, the subcomponents change position with the luminance due to the demodulation of the signal. As is seen, there are harmonics of the N and P located on the x axis. Accordingly, the U and V subcomponents are solely dependent upon frequency and amplitude spectrum and they no longer have any phase dependence.

Figure 5D:
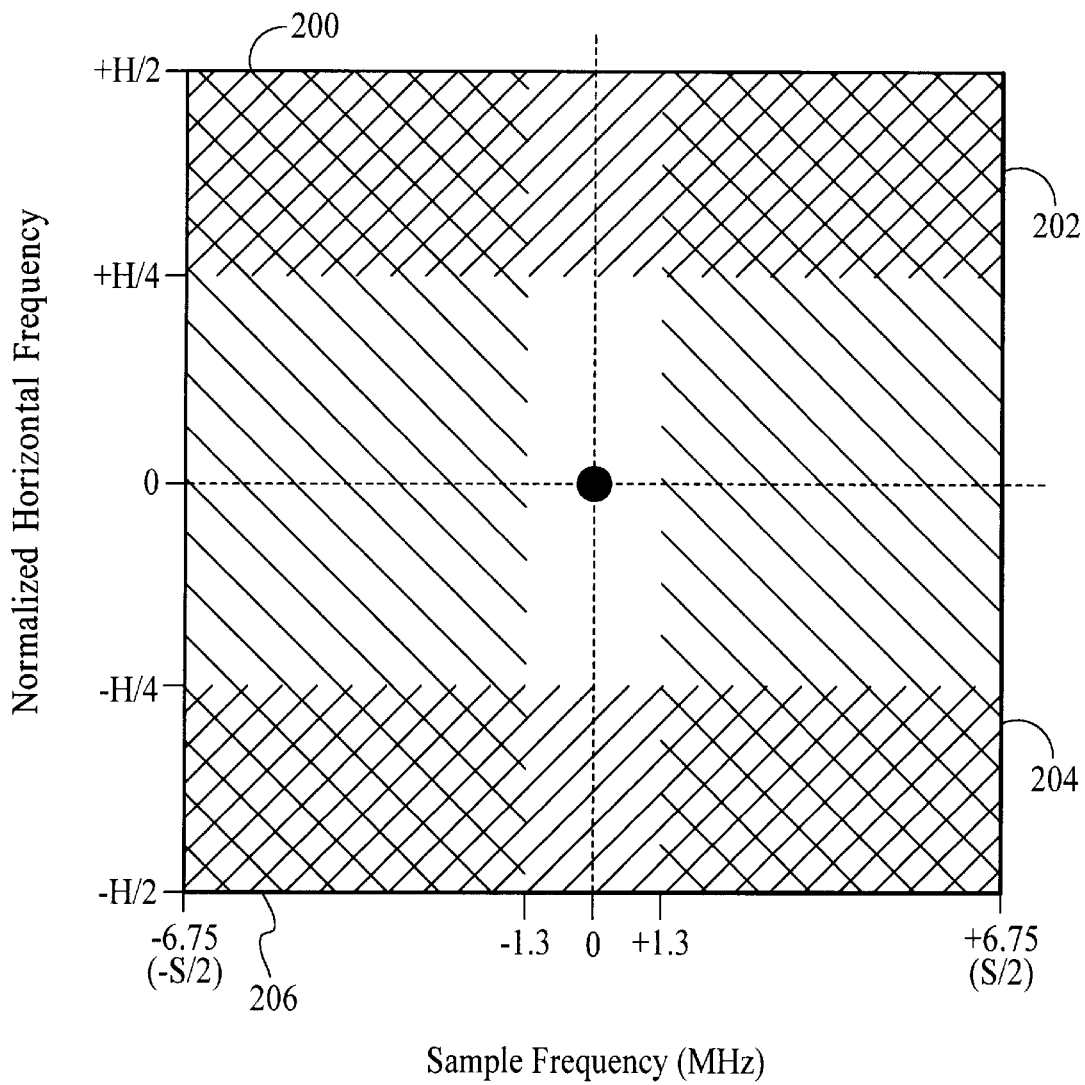
Figure 5D:
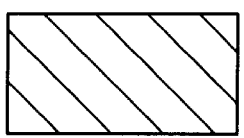
Figure 5D:
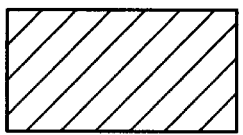
Figure 5E:
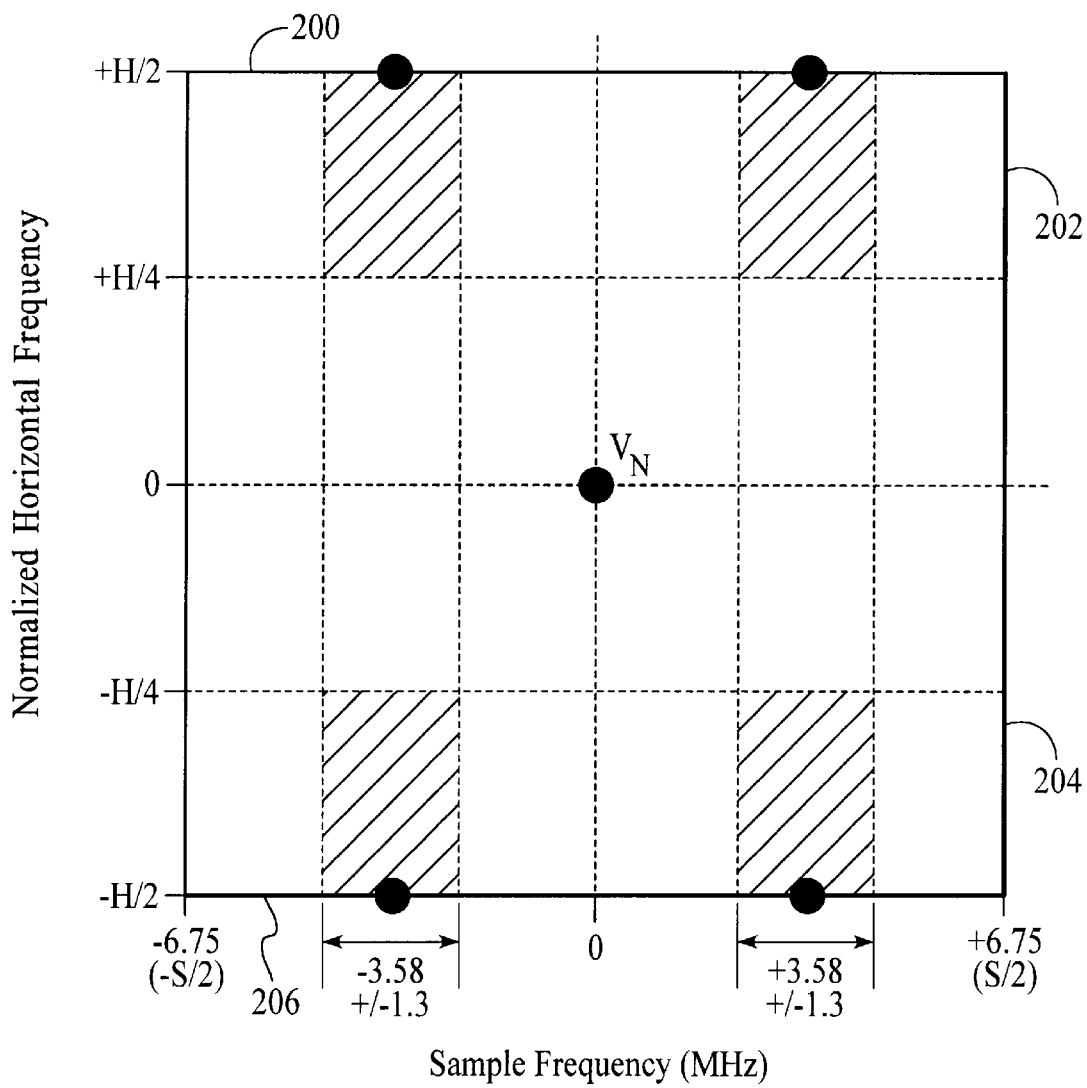
Figure 5F:
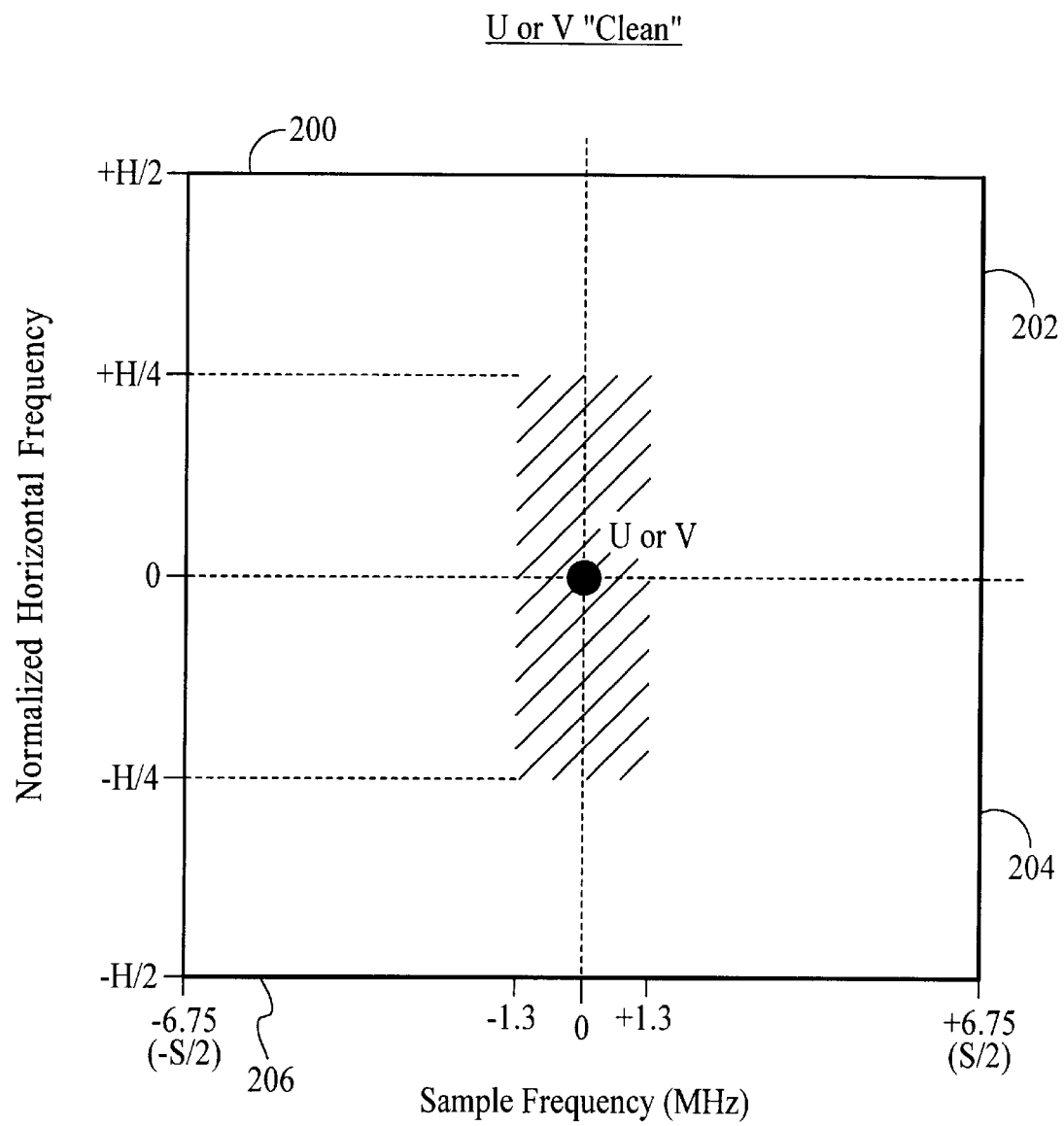
Figure 5G:
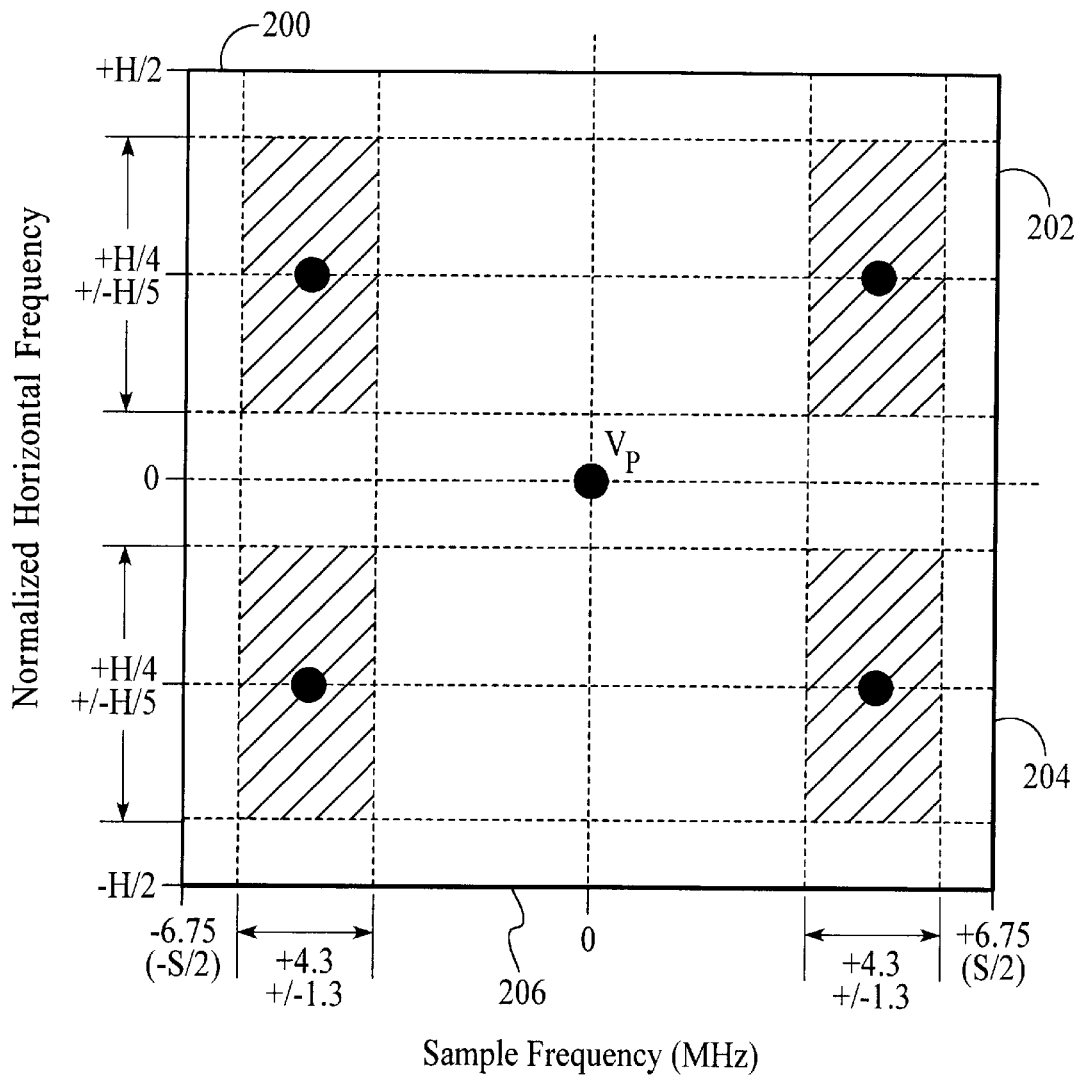

The remaining process that needs to be accomplished is cleaning up the dirty U and V components. That is the N and P harmonics, as well as the luminance components (Yn and Yp) should be removed to provide the clean U' and V' subcomponents. Referring now to FIG. 5D, vertical and horizontal stop bands are being provided to eliminate the unwanted spectral information. Accordingly, clean U' and V' subcomponents are provided after this post filtering process, shown in FIG. 5E. Finally, appropriate multi-dimensional notch filtering provides the extracted luminance dependent upon whether it is an NTSC signal as shown in FIG. 5F or a PAL signal as shown in FIG. 5G.

Figure 6:
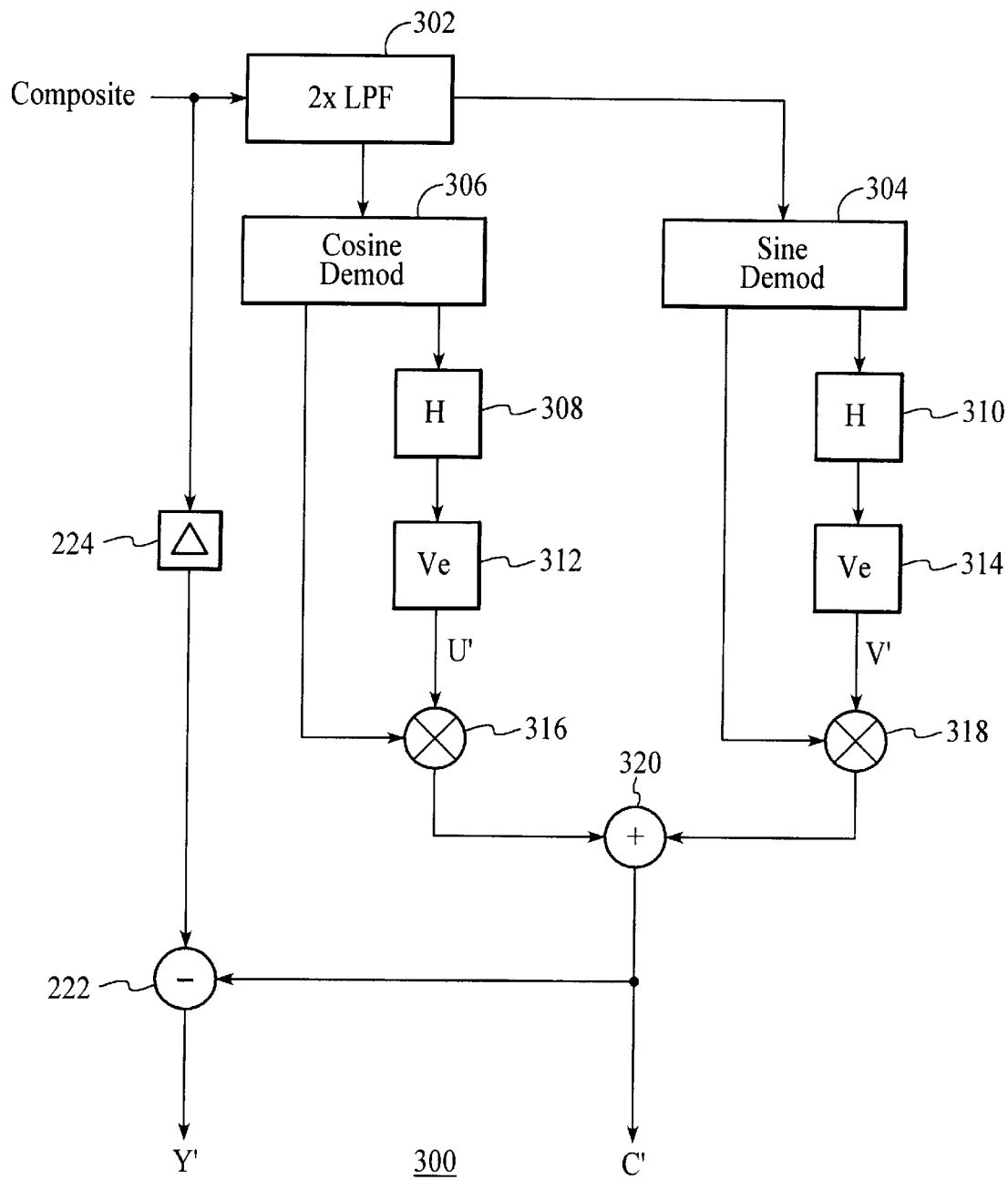
FIG. 6 is a block diagram of one embodiment of a system in accordance with the present invention.

FIG. 6 is a block diagram of an embodiment of a system in accordance with the present invention. In this embodiment, the composite signal is provided to a filter 302 that is for example, a maximum of two times the Nyquist sampling rate. In so doing, the effects of aliasing and harmonics are substantially attenuated. The filter 302 provides a subsample hole which allows for postprocessing of the dirty U and V subcomponents. In one embodiment, filter 302 comprises a low-pass filter. However, one of ordinary skill in the art will readily recognize many types of filters could be utilized to perform this function. Accordingly, the composite signal is demodulated by a cosine demodulator 306 and by a sine demodulator 304. The sine demodulator 306 provides a dirty V subcomponent. The cosine demodulator 304 provides a dirty U subcomponent. It should be understood, although in this embodiment the demodulators are described as cosine and sine demodulators, they could be complementary demodulators and their use would be within the spirit and scope of the present invention. Therefore one demodulator would be referred to as a color component demodulator and the other demodulator would then be referred to as the color component complement demodulator. Horizontal and vertical processing and filtering units 308 and 312 clean up the dirty U subcomponent. Similarly, horizontal and vertical processing and filtering units 310 and 314 provide a clean U and V component. The clean V component plus a signal from the sine demodulator 304 is utilized to remodulate the V component via block 316. Similarly, the clean U subcomponent and the cosine demodulator 304 are used to remodulate the U subcomponent via block 318. The remodulated U and V subcomponents are then combined via block 320 to provide a clean C' component.

In accordance with the principles above described, a comb filter system and method in accordance with the present invention does not have the artifact problems associated with prior art comb filtering systems. Hence, by demodulating the subcomponents of the chrominance prior to separation of the luminance and chrominance information, a remodulated chrominance and extracted luminance is provided and is substantially free of artifacts.

Another feature of this invention is the ability to scale video using the same delay elements and the same computation elements as used for separation. The scaling of the image can be non-linear and adaptive. For example, a microprocessor may scale and separate at different times. In another embodiment, dedicated hardware may scale and separate at the same time. This presents a major cost savings over present separation methods.

Although the present invention has been described in accordance with the embodiments shown, one of ordinary skill in the art will readily recognize that there could be variations to the embodiments and those variations would be within the spirit and scope of the present invention. It should be understood that although the present invention has been described in a two-dimensional context, one of ordinary skill in the art recognizes that the processing can be multi-dimensional and that would be within the spirit and scope of the present invention. In addition, it should be understood that horizontal and vertical processing can be non-linear or linear and its use would be within the spirit and scope of the present invention. Furthermore, it should be understood that a system in accordance with the present invention can be digital or analog and its use would be within the spirit and scope of the present invention. Finally, although adaptive control is not required to implement a system and method in accordance with the present invention, adaptive control could be utilized as a supplement thereto. Accordingly, many modifications may be made by one of ordinary skill in the art without departing from the spirit and scope of the appended claims.

What is claimed is:

1. A method for separating chrominance and luminance information from a composite spectral signal, the composite spectral signal being a baseband frequency signal, the method comprising the sequential steps of:
   (a) modifying the composite spectral signal to attenuate aliasing;
   (b) demodulating a chroma portion of the composite spectral signal prior to separation of the chrominance or luminance information to provide a first U subcomponent and a first V subcomponent;
   (c) horizontally and vertically processing the first U subcomponent and the first V subcomponent to provide a second U subcomponent and a second V subcomponent, respectively; and
   (d) combining the second U subcomponent and the second V subcomponent to provide the remodulated chrominance information.

2. The method of claim 1 in which the modifying step (a) is performed by a bandpass or a low pass filter.

3. The method of claim 1 wherein the processing step (c) comprises sequentially horizontally and vertically processing the first U and V subcomponents.

4. The method of claim 1 wherein the processing step (c) comprises sequentially vertically and horizontally processing the first U and V subcomponents.

5. The method of claim 1 wherein the processing step (c) comprises vertically and horizontally processing the first U and V subcomponents at substantially the same time.

6. The method of claim 1 which the processing step (c) further comprises the step of temporally processing the first U and V subcomponents to provide the second U and V subcomponents.

7. The method of claim 1 further comprises scaling a resultant video signal within the processing step (c).

8. The method of claim 7 further comprises scaling and separating the chrominance and luminance at substantially the same time.

9. The method of claim 7 further comprises scaling and separating the chrominance and luminance at different times.

10. The method of claim 1 which further comprises the step of:
    (e) subtracting the remodulated chrominance information from the composite spectral signal to provide an extracted luminance information.

11. The method of claim 1 in which the demodulating step (b) comprises the steps of:
    (b1) color component demodulating the composite signal to provide the first U subcomponent; and
    (b2) color component complement demodulating the composite signal to provide the first V subcomponent.

12. The method of claim 1 in which the modifying step (a) comprises the step of processing the composite signal to attenuate the frequencies in the region of harmonics of the subcarrier frequency to attenuate aliasing.

13. A system for separating chrominance and luminance information from a composite spectral signal, the composite spectral signal being a baseband frequency signal; the system comprising:
    means for modifying the composite spectral signal to attenuate aliasing;
    means for demodulating a chroma portion of the composite spectral signal prior to separation of the chrominance or luminance information to provide a first U subcomponent and a first V subcomponent;
    means for horizontally and vertically processing the first U subcomponent and the first V subcomponent to provide a second U subcomponent and a second V subcomponent, respectively; and
    means for combining the second U subcomponent and the second V subcomponent to provide the remodulated chrominance information.

14. The system of claim 13 which the means for modifying the composite signal to attenuate aliasing comprises a band pass filter or a low pass filter.

15. The system of claim 13 wherein the processing means comprises means for sequentially horizontally and vertically processing the first U and V subcomponents.

16. The system of claim 13 wherein the processing means comprises means for sequentially vertically and horizontally processing the first U and V subcomponents.

17. The system of claim 13 wherein the processing means comprises means for vertically and horizontally processing the first U and V subcomponents at substantially the same time.

18. The system of claim 13 which the processing means further comprises means for temporally processing the first U and V subcomponents to provide the second U and V subcomponents.

19. The system of claim 13 which further comprises means for scaling a resultant video signal within the processing means.

20. The system of claim 19 which further comprises means for scaling and separating the chrominance and luminance at substantially the same time.

21. The system of claim 19 which further comprises means for scaling and separating the chrominance and luminance at different times.

22. The system of claim 13 which further comprises means for subtracting the remodulated chrominance information from the composite spectral signal to provide a extracted luminance information.

23. The system of claim 13 in which the demodulating means comprises:
   means for color component demodulating the composite signal to provide the first U subcomponent; and
   means for color component complement demodulating the composite signal to provide the first V subcomponent.

24. The system of claim 13 in which the modifying means comprises means for processing the composite signal to attenuate the frequencies in the region of harmonics of the subcarrier frequency to attenuate aliasing.

25. A method for separating chrominance and luminance information from a composite spectral signal, the composite spectral signal being a baseband frequency signal; the method comprising the sequential steps of:
   (a) modifying the composite spectral signal to attenuate aliasing;
   (b) demodulating a chroma portion of the composite spectral signal prior to obtaining the chrominance information to provide a first U subcomponent and a first V subcomponent;
   (c) horizontally and vertically processing the first U subcomponent and the first V subcomponent to provide a second U subcomponent and a second V subcomponent, respectively; and
   (d) combining the second U subcomponent and the second V subcomponent to provide the remodulated chrominance information.

26. The method of claim 25 in which the modifying step (a) is performed by a band pass or a low pass filter.

27. The method of claim 25 wherein the processing step (c) comprises sequentially horizontally and vertically processing the first U and V subcomponents.

28. The method of claim 25 wherein the processing step (c) comprises vertically and horizontally processing the first U and V subcomponents at substantially the same time.

29. The method of claim 25 wherein the processing step (c) comprises sequentially vertically and horizontally processing the first U and V subcomponents.

30. The method of claim 25 which the processing step (c) further comprises the step of temporally processing the first U and V subcomponents to provide the second U and V subcomponents.

31. The method of claim 25 further comprises scaling a resultant video signal within the processing step (c).

32. The method of claim 31 further comprises scaling and separating the chrominance and luminance at substantially the same time.

33. The method of claim 31 further comprises scaling and separating the chrominance and luminance at different times.

34. The method of claim 25 which further comprises the step of:
   (e) subtracting the remodulated chrominance information from the composite spectral signal to provide an extracted luminance information.

35. The method of claim 25 in which the demodulating step (b) comprises the steps of:
   (b1) color component demodulating the composite signal to provide the first U subcomponent; and
   (b2) color component complement demodulating the composite signal to provide the first V subcomponent.

36. The method of claim 25 in which the modifying step (a) comprises the step of processing the composite signal to attenuate the frequencies in the region of harmonics of the subcarrier frequency to attenuate aliasing.

37. A system for separating chrominance and luminance information from a composite spectral signal, the composite spectral signal being a baseband frequency signal; the system comprising:
   means for modifying the composite spectral signal to attenuate aliasing;
   means for demodulating a chroma portion of the composite spectral signal prior to obtaining the chrominance information to provide a first U subcomponent and a first V subcomponent;
   means for horizontally and vertically processing the first U subcomponent and the first V subcomponent to provide a second U subcomponent and a second V subcomponent, respectively; and
   means for combining the second U subcomponent and the second V subcomponent to provide the remodulated chrominance information.

38. The system of claim 37 in which the means for modifying the composite signal to attenuate aliasing comprises a band pass or a low pass filter.

39. The system of claim 37 wherein the processing means comprises means for sequentially horizontally and vertically processing the first U and v subcomponents.

40. The system of claim 37 wherein the processing means comprises means for vertically and horizontally processing the first U and V subcomponents at substantially the same time.

41. The system of claim 37 wherein the processing means comprises means for sequentially vertically and horizontally processing the first U and V subcomponents.

42. The system of claim 37 which the processing means for temporally processing the first U and V subcomponents to provide the second U and V subcomponents.

43. The system of claim 37 further comprises means for scaling a resultant video signal within the processing means.

44. The system of claim 43 which further comprises means for scaling and separating the chrominance and luminance at substantially the same time.

45. The system of claim 43 which further comprises means for scaling and separating the chrominance and luminance at different times.

46. The system of claim 37 which further comprises means for subtracting the remodulated chrominance information from the composite spectral signal to provide a extracted luminance information.

47. The system of claim 37 in which the demodulating means comprises:
    means for color component demodulating the composite signal to provide the first U subcomponent; and
    means for color component complement demodulating the composite signal to provide the first V subcomponent.

48. The system of claim 37 in which the modifying means comprises means for processing the composite signal to attenuate the frequencies in the region of harmonics of the subcarrier frequency to attenuate aliasing.

49. A method for separating chrominance information from a composite spectral signal, the composite spectral signal being a baseband frequency signal; the method comprising the sequential steps of:
    (a) modifying the composite spectral signal to attenuate aliasing;
    (b) demodulating a chroma portion of the composite spectral signal prior to separation of the chrominance information to provide a first U subcomponent and a first V subcomponent; and
    (c) horizontally and vertically processing the first U subcomponent and the first V subcomponent to provide a second U subcomponent and a second V subcomponent, respectively.

50. The method of claim 47 in which the modifying step (a) is performed by a pass band or a low band filter.

51. The method of claim 47 wherein the processing step (c) comprises sequentially horizontally and vertically processing the first U and V subcomponents.

52. The method of claim 47 wherein the processing step (c) comprises sequentially vertically and horizontally processing the first U and V subcomponents.

53. The method of claim 47 wherein the processing step (c) comprises vertically and horizontally processing the first U and V subcomponents at substantially the same time.

54. The method of claim 47 which the processing step (c) further comprises the step of temporally processing the first U and V subcomponents to provide the second U and V subcomponents.

55. The method of claim 47 further comprises scaling a resultant video signal within the processing step (c).

56. The method of claim 55 further comprises scaling and separating the chrominance information at substantially the same time.

57. The method of claim 55 further comprises scaling and separating the chrominance information at different times.

58. The method of claim 47 in which the demodulating step (b) comprises the steps of:
    (b1) color component demodulating the composite signal to provide the first U subcomponent; and
    (b2) color component complement demodulating the composite signal to provide the first V subcomponent.

59. The method of claim 47 in which the modifying step (a) comprises the step of processing the composite signal to attenuate the frequencies in the region of harmonics of the subcarrier frequency to attenuate aliasing.

60. A system for separating chrominance information from a composite spectral signal, the composite spectral signal being a baseband frequency signal; the system comprising:
    means for modifying the composite spectral signal to attenuate aliasing;
    means for demodulating a chroma portion of the composite spectral signal prior to separation of the chrominance information to provide a first U subcomponent and a first V subcomponent; and
    means for horizontally and vertically processing the first U subcomponent and the first V subcomponent to provide a second U subcomponent and a second V subcomponent, respectively.

61. The system of claim 60 which the means for modifying the composite signal to attenuate aliasing comprises a band pass or a low pass filter.

62. The system of claim 60 wherein the processing means comprises means for sequentially horizontally and vertically processing the first U and V subcomponents.

63. The system of claim 60 wherein the processing means comprises means for sequentially vertically and horizontally processing the first U and V subcomponents.

64. The system of claim 60 wherein the processing means comprises means for vertically and horizontally processing the first U and V subcomponents at substantially the same time.

65. The system of claim 60 which the processing means further comprises means of temporally processing the first U and V subcomponents to provide the second U and V subcomponents.

66. The system of claim 60 which further comprises means for scaling a resultant video signal within the processing means.

67. The system of claim 66 which further comprises means for scaling and separating the chrominance information at substantially the same time.

68. The system of claim 66 which further comprises means for scaling and separating the chrominance information at different times.

69. The system of claim 60 in which the demodulating means comprises:
    means for color component demodulating the composite signal to provide the first U subcomponent; and
    means for color component complement demodulating the composite signal to provide the first V subcomponent.

70. The system of claim 60 in which the modifying means comprises means for processing the composite signal to attenuate the frequencies in the region of harmonics of the subcarrier frequency to attenuate aliasing.

71. A method for separating chrominance information from a composite spectral signal, the composite spectral signal being a baseband frequency signal; the method comprising the sequential steps of:
    (a) modifying the composite spectral signal to attenuate aliasing;
    (b) modulating a chroma portion of the composite spectral signal prior to obtaining the chrominance information to provide a first U subcomponent and a first V subcomponent; and
    (c) horizontally and vertically processing the first U subcomponent and the first V subcomponent to provide a second U subcomponent and a second V subcomponent, respectively.

72. The method of claim 71 in which the modifying step (a) is performed by a band pass or a low pass filter.

73. The method of claim 71 wherein the processing step (c) comprises sequentially horizontally and vertically processing the first U and V subcomponents.

74. The method of claim 71 wherein the processing step (c) comprises sequentially vertically and horizontally processing the first U and V subcomponents.

75. The method of claim 71 wherein the processing step (c) comprises vertically and horizontally processing the first U and V subcomponents at substantially the same time.

76. The method of claim 71 which the processing step (c) further comprises the step of temporally processing the first U and V subcomponents to provide the second U and V subcomponents.

77. The method of claim 71 further comprises scaling a resultant video signal within the processing step (c).

78. The method of claim 77 further comprises scaling and separating the chrominance information at substantially the same time.

79. The method of claim 77 further comprises scaling and separating the chrominance information at different times.

80. The method of claim 71 in which the demodulating step (b) comprises the steps of:

(b1) color component demodulating the composite signal to provide the first U subcomponent; and (b2) color component complement demodulating the composite signal to provide the first V subcomponent.

81. The method of claim 71 in which the modifying step (a) comprises the step of processing the composite signal to attenuate the frequencies in the region of harmonics of the subcarrier frequency to attenuate aliasing.

82. A system for separating chrominance information from a composite spectral signal, the composite spectral signal being a baseband frequency signal; the system comprising:

means for modifying the composite spectral signal to attenuate aliasing;

means for demodulating a chroma portion of the composite spectral signal prior to obtaining the chrominance information to provide a first U subcomponent and a first V subcomponent; and means for horizontally and vertically processing the first U subcomponent and the first V subcomponent to provide a second U subcomponent and a second V subcomponent, respectively.

83. The system of claim 82 in which the means for modifying the composite signal to attenuate aliasing comprises a band pass and a low pass filter.

84. The system of 82 wherein the processing means comprises means for sequentially horizontally and vertically processing the first U and V subcomponents.

85. The system of claim 82 wherein the processing means comprises means for sequentially vertically and horizontally processing the first U and V subcomponents.

86. The system of claim 82 wherein the processing means comprises means for vertically and horizontally processing the first U and V subcomponents at substantially the same time.

87. The method of claim 82 which the processing means further comprises means for temporally processing the first U and V subcomponents to provide the second U and V subcomponents.

88. The system of claim 82 further comprises means for scaling a resultant video signal within the processing means.

89. The system of claim 88 which further comprises means for scaling and separating the chrominance information at substantially the same time.

90. The system of claim 88 which further comprises means for scaling and separating the chrominance information at different times.

91. The system of claim 82 in which the demodulating means comprises:

means for color component demodulating the composite signal to provide the first U subcomponent; and means for color component complement demodulating the composite signal to provide the first V subcomponent.

92. The system of claim 82 in which the modifying means comprises means for processing the composite signal to attenuate the frequencies in the region of harmonics of the subcarrier frequency to attenuate aliasing.

* * * * *